_United States Patent_ [19]

Champagne et al.

[11] Patent Number: 4,750,165
[45] Date of Patent: Jun. 7, 1988

[54] METHOD OF DUPLEX DATA TRANSMISSION USING A SEND-AND-WAIT PROTOCOL

[75] Inventors: Claude J. Champagne, Carleton Place; Ernst A. Munter, Kanata, both of Canada

[73] Assignee: Northern Telecom Limited, Montreal, Canada

[21] Appl. No.: 860,359

[22] Filed: May 6, 1986

[51] Int. Cl.$^4$ .............................................. H04B 9/00
[52] U.S. Cl. .................................. 370/24; 370/110.1; 371/70
[58] Field of Search .......................... 370/94 U, 110.1; 371/32, 33, 70

[56] References Cited

U.S. PATENT DOCUMENTS 4,213,201  7/1980  Gagnier et al. ....................... 370/62
4,577,317  3/1986  Chu et al. .......................... 370/110.1

OTHER PUBLICATIONS

Bodart–Code and Speed Dependent TDM–Phillips Telecommunication Review–vol. 36, #4, Nov. 1978, pp. 197–201.

_Primary Examiner_—Robert L. Griffin
_Assistant Examiner_—L. Van Beek
_Attorney, Agent, or Firm_—F. P. Turpin

[57] ABSTRACT

The invention provides a method of communicating data between a pair of transceivers in a full-duplex manner using a send-and-wait data handling protocol. The transceivers are connected by a pair of communication paths and each transceiver is adapted to simultaneously transmit data on one communication path and receive data on the other. Each transducer generates primary and secondary messages and these are multiplexed by injecting the secondary messages into the primary message stream in such a way that the secondary messages are readily differentiated from the primary messages at the receiving transceiver.

10 Claims, 7 Drawing Sheets

|   | NODE A | | NODE B | | NODE MUX STATE | |
|   | Pa | Sa | Pb | Sb | NODE A | NODE B |
|---|---|---|---|---|---|---|
| 1 | IDLE | | IDLE | | 1 | 1 |
| 2 | IDLE | – – – – | | SESC | 1 | 1 |
| 3 | | SESC – – – – | IDLE | | 1 | 1 |
| 4 | | IDLE – – – – MIS | | | 1 | 3 |
| 5 | IDLE | – – – – MIS | | | 1 | 3 |
| 6 | IDLE | – – – – MIS | | | 1 | 3 |
| 7 | | SESC – – – – MIS | | | 1 | 3 |
| 8 | | SEND – – – – MIS | | | 2 | 3 |
| 9 | MIS | – – – – MIS | | | 2 | 3 |
| 10 | MIS | – – – – SOM | | | 2 | 3 |
| 11 | | SESC – – – – mb1 | | | 2 | 3 |
| 12 | | SEND – – – – | SESC | | 3 | 2 |
| 13 | MIS | – – – – | SEND | | 3 | 2 |
| 14 | MIS | – – – – mb2 | | | 3 | 2 |
| 15 | SOM | – – – – mb3 | | | 3 | 2 |
| 16 | ma1 | – – – – | SESC | | 3 | 2 |
| 17 | ma2 | – – – – | SEND | | 3 | 3 |
| 18 | ma3 | – – – – mb4 | | | 3 | 3 |
| 19 | ma4 | – – – – mb5 | | | 3 | 3 |
| 20 | CRCa | – – – – mb6 | | | 3 | 3 |
| 21 | CRCa | – – – – mb7 | | | 3 | 3 |
| 22 | EOM | – – – – mb8 | | | 3 | 3 |
| 23 | EOM | – – – – mb9 | | | 3 | 3 |
| 24 | EOM | – – – – mb10 | | | 3 | 3 |
| 25 | EOM | – – – – | SESC | | 3 | 2 |
| 26 | EOM | – – – – | PACK | | 3 | 2 |
| 27 | EOM | – – – – mb11 | | | 3 | 2 |
| 28 | IDLE | – – – – mb12 | | | 1 | 2 |
| 29 | IDLE | – – – – | SESC | | 1 | 2 |
| 30 | | SESC – – – – | PACK | | 1 | 2 |
| 31 | | SEND – – – – mb13 | | | 1 | 3 |
| 32 | IDLE | – – – – mb14 | | | 1 | 3 |
| 33 | IDLE | – – – – mb15 | | | 1 | 3 |
| 34 | | SESC – – – – mb16 | | | 1 | 3 |
| 35 | | | | | | |

| Pa | Sa | Pb | Sb |
|---|---|---|---|
| IDLE | | | |
| IDLE | | IDLE | |
| | SESC | IDLE | |
| | IDLE | | SESC |
| MIS | | | IDLE |
| MIS | | MIS | |
| | SESC | MIS | |
| | IDLE | | SESC |
| MIS | | | IDLE |
| MIS | | MIS | |
| | SESC | MIS | |
| | SEND | | SESC |
| MIS | | | SEND |
| MIS | | MIS | |
| | SESC | MIS | |
| | SEND | | SESC |
| SOM | | | SEND |
| ms1 | | SOM | |
| • | | ms1 | |
| • | | • | |
| • | | • | |
| msn | | • | |
| EOM | | msn | |
| EOM | | EOM | |
| EOM | | EOM | |
| EOM | | EOM | |
| | SESC | EOM | |
| | PACK | | SESC |
| EOM | | | PACK |
| EOM | | EOM | |
| | SESC | EOM | |
| | PACK | | SESC |
| IDLE | | | PACK |
| IDLE | | IDLE | |
| | SESC | IDLE | |
| | PACK | | SESC |
| IDLE | | | PACK |
| IDLE | | IDLE | |
| | SESC | IDLE | |
| | IDLE | | SESC |
| | | | IDLE |

FIG. 7

METHOD OF DUPLEX DATA TRANSMISSION USING A SEND-AND-WAIT PROTOCOL

The invention relates generally to digital switching systems and more particularly to a method of providing full-duplex transmission between two modules of such a system using a send-and-wait protocol.

BACKGROUND OF THE INVENTION

The contemporary telecommunications systems are increasingly digital in nature and the proliferation of microprocessors has resulted in distributed processing with the systems. In order to take advantage of these developments, the systems tend to be modularized with the modules being interconnected by data links. The information transferred on these links is controlled by various protocols which may be either bit-oriented or byte-oriented.

Bit-oriented protocols comprise the likes of the Synchronous Data Link Control (SDLC), the High Level Data Link Control (HDLC) and the Advanced Data Communications Control Procedure (ADCCP) protocol. These bit-oriented protocols assign specific meaning to the individual bits of each field of the data stream. All communications in such systems are in the form of frames of uniform format and each frame comprises a number of fields each having a definite location and precise meaning.

In byte-oriented protocols, information is transferred in the form of a block of data which may consist of sync characters, an address, control characters, an information field and an error checking code. Special block control characters are used to effect orderly operation of the data link. Once a communications channel is established and the transmitter sends one block of data, it stops and waits for an acknowledgement (ACK) signal before sending another block. The receiver, having acquired the block of data, checks for errors and then sends a positive acknowledgement (PACK) control character to the transmitter indicating that the block is correct or a negative acknowledgement (NACK) control character to indicate an error. On reception of the NACK control signal, the transmitter may retransmit the block of data or take other corrective or maintenance action. Examples of such send-and-wait protocols are the Binary Synchronous Communications (Bisync) protocol and the DS-30 protocol. A description of the latter may be found in U.S. Pat. No. 4,213,201 issued to R. Gagnier et al. and assigned to the present assignee, especially at column 11, lines 33 et seq.

A serious drawback of send-and-wait or compelled protocols is that they are limited to half-duplex (two-way alternate) operation. It is therefore an object of this invention to provide a send-and-wait protocol which provides full-duplex operation.

SUMMARY OF THE INVENTION

In accordance with the invention there is provided a method of communicating data between a pair of transceivers in a full-duplex manner using a send-and-wait data handling protocol. The transceivers are connected by a pair of communication paths and each transceiver is adapted to simultaneously transmit data on one communication path and receive data on the other communication path. The method comprises the steps of generating primary and secondary messages at each transceiver and multiplexing the primary messages with the secondary messages by injecting the secondary messages into the primary message streams in such a way that the secondary messages are readily differentiated from the primary messages at the receiving transceivers.

BRIEF DESCRIPTION OF THE DRAWINGS

The invention is further described by way of illustrative particulars with reference to the annexed drawings, in which.

GENERAL DESCRIPTION

Figure 1A:
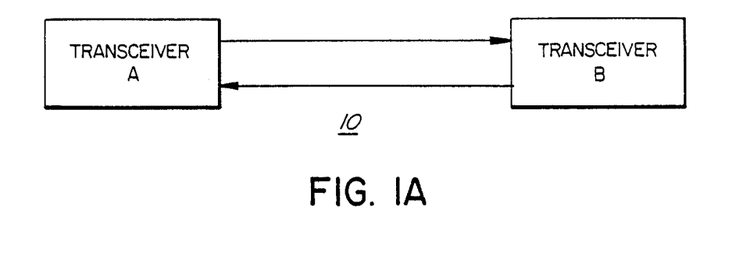
FIG. 1A is a block diagram of a data link between two modules of a digital switching system.

FIG. 1A shows a pair of transceivers A and B which may for example be two nodes or modules in the telecommunication system described in the aforementioned U.S. Pat. No. 4,213,201. These transceivers communicate on a two-way alternate message channel 10 using a known send-and-wait protocol, for example, the DS-30 protocol mentioned above. The message channel 10 between the transceivers is activated as a result of a handshaking protocol using one-byte control codes referred to as code signals. Briefly, these are as follows:

IDLE—indicates that the link is not being used.

MIS—May I Send—indicates to the receiver that the other transceiver wishes to send a message.

SEND—Send—code sent by receive transceiver to indicate to the transmit transceiver that it is ready to receive a message.

MSG—Message data.

CHECKSUM—A number derived from the arithmetic treatment of the message data for verifying correct reception of the message.

PACK—Positive Acknowledgement code sent to transmitting transceiver by receiving transmitter to indicate correct reception of the message.

NACK—Negative Acknowledgement—code sent to transmitting transceiver by receiving transmitter to indicate that the last received message was incorrect.

IWS—I Will Send—code sent to transceiver wishing to transmit to make it "back down" and return to IDLE status.

The actual format of the message sent on the link 10 will of course depend on the application or function of the A and B transceivers. It would generally contain a start of message (SOM) byte followed by a length of message and destination identification byte(s) as well as the information (MSG).

Figure 1B:
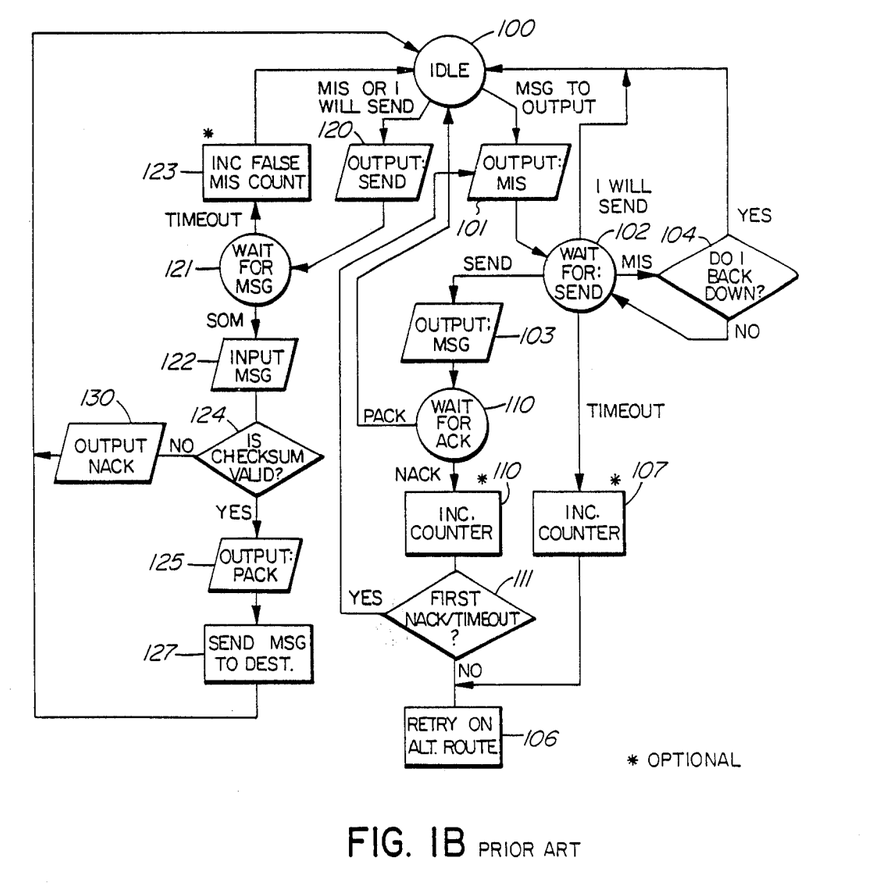
FIG. 1B is a flow chart depicting a known method of message interchange between the transceivers of FIG. 1.

The flow diagram of FIG. 1B may be regarded as a summary of the input/output protocol for message handling. It indicates the various states the equipment may have at each end of a two-way signal channel, the events that will produce various responses, and the changes of state and the responses that will be made.

As is common in flow diagrams, the states are represented by circles, the external events and, in some cases, decisions, are indicated by legends not framed at all, output functions are indicated in parallelograms, input and administrative functions in rectangles and decisions are indicated by diamonds. Some administrative functions are optional and these are starred to so indicate.

The rest condition is designated as IDLE by the circle 100; this code signal is repeated periodically until either a message is to be transmitted by the unit in question or a signal is received to indicate that the equipment at the other end of the channel wishes to send. As soon as a message is ready to be transmitted (i.e. is located in a buffer for transmission), the output MIS is substituted for the IDLE code as indicated by the parallelogram 101 and the state then changes to that indicated at 102 in which the unit waits for the response SEND, while continuing to transmit MIS periodically. There are four ways in which this state can be brought to an end. The message SEND can arrive, leading to the transmission of a message as indicated by the parallelogram 103; the message MIS can be received, raising a question of whether the unit should or should not back down, as indicated by the decision diamond 104, or in certain cases to be specified later, the superceding message IWS meaning "I will send" may be received from a unit not prepared to receive a message in which case the unit receiving the IWS will return to the IDLE state 100 and act as if it had received an MIS code while being IDLE. Another possibility is that while the unit is in the "Wait for send" (WFS) state 102, none of the previous events will occur within some predetermined period which, if everything were in normal operation, one of them would occur. This "timeout" indicates a malfunction and leads to a retrial on an alternate route, if any. Preferably, the going over to a retrial on an alternate route is preceded by reporting the malfunction, which generally involves incrementing a counter that registers the accumulated number of these failures. This operation is indicated by the rectangle 107. The state of this counter may at various stages trigger other maintenance actions.

In the case where the message is sent as indicated by the parallelogram 103, that operation is followed by the unit entering the state 110 in which it waits for acknowledgement. If the latter is positive (PACK), the unit returns to the IDLE state and the message is erased from its buffer, which now becomes ready to receive another outgoing message. If NACK is received or if nothing is received for the timeout period, another malfunction counter is incremented, as indicated at 110, and a memory is consulted in order to make the decision, as indicated by the diamond 111, whether the NACK or timeout was the first such occurrence or whether it was the second in succession. In the first case, the unit goes back to the situation at which it sent MIS (parallelogram 101), and in the other case, it proceeds to a retrial on an alternate route (rectangle 106).

The other way out of the IDLE state 100 occurs upon reception of either the MIS code or the IWS code. The unit then responds with the output SEND as shown in the parallelogram 120 and proceeds to the state in which it waits for a message designated by the circle 121. The usual result is the reception of the start of message code (SOM) which in this case is also the indication that a data message follows. This, of course, is followed by an indication of the length of the message and the message itself indicated by the parallelogram 122. If no start of message (SOM) signal is received within the timeout period, the counter 123 for the reception of the false MIS is incremented and the unit returns to the IDLE state. During the reception of a message, the checksum is computed and the result, is compared with the checksum transmitted at the end of the message, as indicated by the decision diamond 124. If the checksum is correct, PACK is sent, as indicated in parallelogram 125, and the unit then undertakes to send the message to destination, which of course means either transmitting it further on another circuit or transferring it to a local decoder, so that this reaction is indicated by the rectangle 127. The unit thereafter returns to the IDLE condition 100. If the checksum received was inconsistent with the message, another malfunction counter is preferably operated, as indicated by the rectangle 130. NACK is sent out and the unit returns to the IDLE state 100.

The various timers, as is known, may simply be random-access memory locations associated with the unit's microprocessor, initially loaded with a number corresponding to the timeout period and decremented periodically by the processor's clock.

Figure 1C:
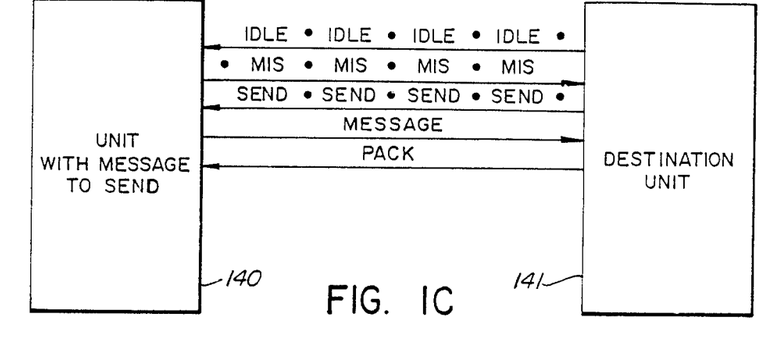
FIGS. 1C, 1D, and 1E are diagrams illustrating particular message sequences between the transceivers of FIG. 1.
Figure 1D:
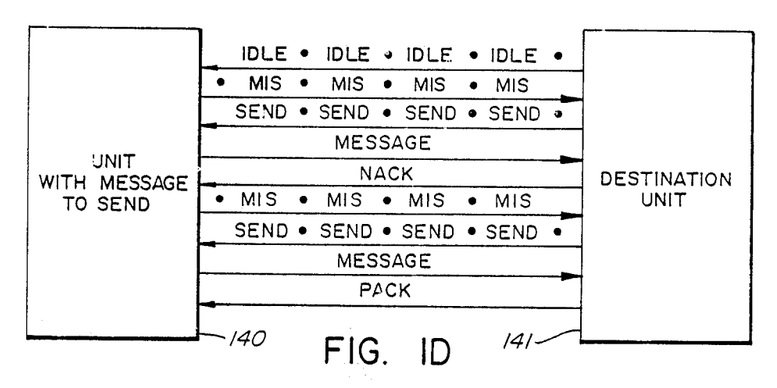
Figure 1E:
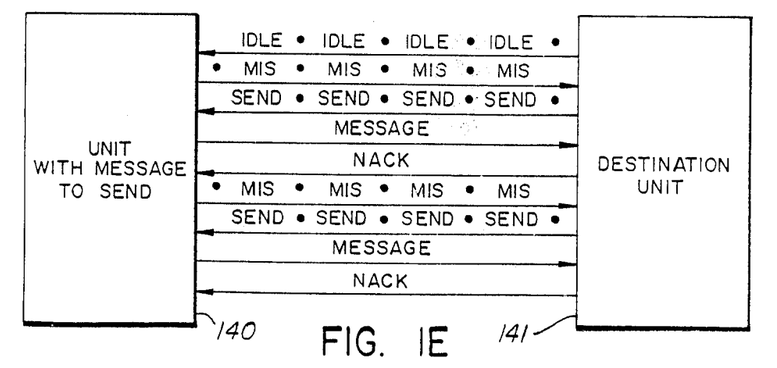

FIGS. 1C, 1D, and 1E illustrate particular message transfer sequences among those comprehended in FIG. 1B. FIG. 1C shows the message transfer sequence where the first attempt is successful. The unit 140 that has a message in its buffer ready to transmit may, for example, be a central message controller, a network message controller or a peripheral module in a contemporary digital telephone switching system. The destination unit 141 to which the message is ready to be transmitted may also be one of the units just mentioned. Where a port of the unit 140 has to be selected to reach the unit 141, that is assumed to have been done by reading the appropriate bytes of the message header to connect the link. The transmission sequence is indicated in descending order by the arrow-headed lines between the units 140 and 141.

When the unit 141 is idle, it sends repeated IDLE codes and when the unit 140 wishes to transmit, it sends repeated MIS codes. The reception of one of these codes causes the unit 141 to send repeated SEND codes to which the unit 141 responds by sending the message.

The last byte of the message is compared with the checksum computed by the unit 141 during message reception. In the case of figure IC, the checksum was correct and the PACK code was sent. The receipt of PACK by the unit 140 allows the latter to clear its buffer in preparation for the next message. The units 140 and 141 are free, after the PACK message has been sent, to revert to the idle state or to proceed to any other state such as MIS required by their message buffers.

FIG. 1D illustrates the condition under which the message checksum did not check out and a NACK signal was sent to unit 140 causing it to repeat the transmit sequence including the message information. On the second attempt, the checksum was correct and a PACK signal was sent to unit 140.

In the case of a double NACK situation as shown in FIG. 1E, the processor may attempt to re-route the message if an alternate path exists and the failure is reported causing a maintenance action to be taken. In addition, a receiving unit such as unit 141 is never told whether its PACK was received. If it fails to be received, the resulting timeout has the same consequence as a double NACK.

Another send-and-wait protocol derived from the above method of data transfer is known as the DMS-X protocol. This is a byte oriented, half-duplex protocol which uses full-duplex message channel. It is a state code driven protocol which allows the communicating transceivers to delay the message transfer if either transceiver is not ready. The state codes are single byte codes used by the transceivers to handshake during message transfers. The codes are MIS, SEND, MSG, PACK, NACK, and ESC. The code ESC Escape—is a special character used for both SOM (Start of Message) and EOM (End of Message). The ESC code is recognized as a SOM signal when it appears singly and follows a plurality of MIS signals, and is recognized as an EOM signal when more than one appear adjacent to one another. All state codes, except for ESC, are filtered—sent twice to avoid wasting message processing capacity on timeouts due to erroneous state transitions. In this protocol, it is not necessary to indicate the message length as part of the message itself since SOM and EOM flags are used. Also, the checksum information is not used and is replaced with 16-bit CRC (Cyclic Redundancy Code) transmitted in two bytes. This is a well-known technique to provide protection against message errors. The CRC is sent in the message as the two bytes preceding the EOM flag. The SOM and EOM flags are not included in the CRC calculation.

The handshaking between transceivers is carried out via single character state codes, each of which is associated with a particular state of a receiver-transmitter pair. Also, the system is compelled in that all state codes are maintained on the links until the expected response or a timeout occurs. The byte format of the message on the link consists of a SOM flag, the body of the message, two bytes of CRC and the EOM flag. The following sequence of state codes between a pair of transceivers illustrates the operation of this method of data transfer between a sender node and a receiver node.

|  | SENDER | RECEIVER |  |
|---|---|---|---|
| 1- |  | IDLE | IDLE |
| 2- |  | IDLE | IDLE |
| 3- |  | MIS | IDLE |
| 4- |  | MIS | IDLE |
| 5- |  | MIS | SEND |
| 6- |  | MIS | SEND |
| 7- SOM | ------- | ESC | SEND |
| 8- |  | MSG | SEND |
| 9- |  |  | SEND |
| 10- |  |  | SEND |
| 11- |  | CRC | SEND |
| 12- |  | CRC | SEND |
| 13- |  | ESC | SEND |
| 14- |  | ┌ESC | SEND┐ |
| 15- |  | │ . | . │ |
| EOM | ------- | │ . | . │ ----compare CRC |
| 16- |  | │ . | . │ |
| 17- |  | │ ESC | SEND┘ |
| 18- |  | │ ESC | PACK (NACK) |
| 19- |  | ┴ ESC | PACK (NACK) |
| 20- |  | IDLE | PACK (NACK) |

| -continued | | |
|---|---|---|
| SENDER | RECEIVER | |
| 21- | IDLE | PACK (NACK) |
| 22- | IDLE | IDLE |

At line 1 both the sender and receiver are sending out signal codes indicating that they are available for message transfer. At line 3, the sender requests permission to send to which the receiver responds with a SEND code at line 5. The delay between the request and the response include a one-byte delay for processing and the link transmission delay. At line 7, the sender sends a SOM signal (ESC) followed by the message data and two CRC bytes. During this time, the receiver absorbs the data and sends SEND signals. The sender then sends a plurality of ESC codes to indicate end of message (EOM). At the reception of at least two ESC, the receiver recognizes EOM and compares CRC to determine the correctness of reception. If the received data was correct a PACK signal is sent and if incorrect a NACK code is sent. If a NACK code is received at the sender, the transmission sequence may be repeated and-/or other corrective action taken.

The present invention is a byte-oriented, send-and-wait protocol which operates in a full-duplex mode and which for convenience is labelled DMS-Y. Both the DMS-X and DMS-Y protocols are ideally suited for use in telecommunications systems particularly in digital switching offices having a distributed architecture wherein the various modules of the system include some intelligence, usually through the use of microprocessors. This protocol provides more efficient intermodule link utilization than DMS-X messages since DMS-Y messages can flow simultaneously in each direction of the link medium. For digital switching system applications for example, this means that outgoing message bursts originated by the central control will have little or no effect on blocking incoming message bursts originated at the peripheral modules and vice-versa.

Since the DMS-Y protocol is an enhancement to the DMS-X protocol presently used in a large number of installed systems, it may be used for communicating with, for example peripheral modules of existing systems that use the DMS-X protocol. The decision of reverting to a half-duplex mode of operation is performed automatically and in a manner that is transparent to the existing DMS-X mode of operation.

The description of the full-duplex mechanism is given in terms of primary and secondary messages that are used for carrying data and returning acknowledgements respectively. Both message types timeshare the link medium in each direction of transmission. The link medium could, for example, be a single 64 Kb/s channel or a multiple set of channels in a multiplexed link, or even all channels of such a link. Each half-duplex protocol interchange mechanism consists of a messaging pair—primary and secondary messages—and the full duplex mechanism is composed of two half-duplex messaging pairs.

Figure 2:
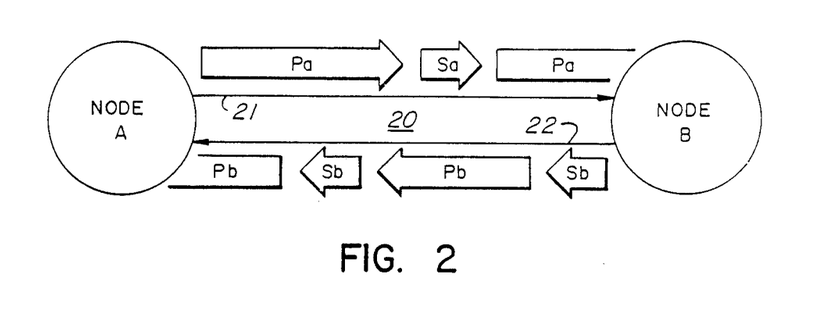
FIG. 2 is a block diagram of a data link between a pair of modules in a switching system and illustrating the message sequences therebetween in accordance with the method of the invention.

FIG. 2 illustrates a pair of nodes A and B linked by a full-duplex message channel 20 composed of half-duplex channels 21 and 22. The channel 21 transports data from node A to node B comprising primary (Pa) and secondary (Sa) messages. The channel 22 transports data from node B to node A comprising primary (Pb) and secondary (Sb) messages. A primary message is defined as any one of: MIS, SOM, MSG, EOM, IDLE and a secondary message is defined as any one of: IDLE, SEND, PACK, NACK. These acronyms are defined similarly for the DMS-Y protocol as they were for the DMS-X protocol.

A messaging pair must step through eight states during the course of a message transaction. These are listed in the following table:

| STATE CODE | PRIMARY MESSAGE | SECONDARY MESSAGE | NEXT STATE(S) | COMMENTS |
|---|---|---|---|---|
| 0 | IDLE | IDLE | 0,1 | |
| 1 | MIS | IDLE | 1,2 | |
| 2 | MIS | SEND | 2,3 | |
| 3 | SOM | SEND | 4 | |
| 4 | MSG | SEND | 4,5 | |
| 5 | EOM | SEND | 5,6 | |
| 6 | EOM | ACK | 6,7 | ACK = PACK, NACK |
| 7 | IDLE | ACK | 7,0 | |

The system is compelled since a messaging pair state must be maintained until the expected response is received or a timeout occurs as discussed later. The primary message is used for requesting message transfer (MIS), performing the transfer (SOM, MSG) and ending the transaction (EOM) between the sender and receiver at opposite ends of the link. The secondary message is used to inform the opposing node's sender about the availability of its receiver (SEND), and to acknowledge that primary messages have been received successfully (PACK) or unsuccessfully (NACK). The byte format of a primary message consists of a start-of-message flag SOM (single ESC), the body of the message (MSG bytes 1 to n), two CRC bytes, and the end-of-message flag EOM (at least two ESC). The CCITT 16-bit cyclic redundancy code CRC is used, as it was for DMS-X, to provide protection against message errors. Secondary messages are excluded from the CRC check.

Differentiation of secondary messages from primary messages is done by means of a unique state code easily detected by the receiver and in a manner that provides DMS-X protocol transparency. The method provides the addition of a new secondary message state code to provide differentiation between the DMS-Y full-duplex and the DMS-X half-duplex modes of operation. The method introduces a new escape code (SESC) and transmits secondary messages as escape sequences for differentiation. A DMS-X protocol handler upon reception of the new state code will simply ignore it whereas the omission of the new state code informs a DMS-Y protocol handler that it is to communicate as a DMS-X protocol handler. The following table identifies example codes allocated to primary and secondary messages. The codes are shown in hexadecimal notation.

| PRIMARY CODES | SECONDARY CODES | CODE |
|---|---|---|
| MIS | — | 8D |
| ESC | — | 4B |
| IDLE | — | 1E |
| — | SEND | 27 |
| — | PACK | 1E |
| — | NACK | 55 |
| — | SESC | 6C |

Ideally, these codes should have a minimum hamming distance from one another to minimize the conversion of one code to another by a "hit" on the link. For example, SESC has been selected to be a hamming distance of four from all primary and other secondary codes. Similarly, the IDLE, PACK, SEND and NACK codes have been selected to be a hamming distance of four with all secondary codes.

Since the bit sequences corresponding to the ESC and SESC codes can appear within the primary message sequence, they must be recognized and modified to provide data transparency. Therefore, when the message data (MSG) contains an ESC byte, the transmitted data is actually an ESC byte followed by its complement; the receiver recognizes the ESC byte and inverts the following byte thereby accepting ($\overline{\text{ESC}}$ = ESC) it as data. Similarly, when the message data (MSG) contains a SESC byte, the transmitted data is an ESC byte followed by the complement of SESC; the receiver recognizes the ESC byte and inverts the following byte thereby accepting ($\overline{\text{SESC}}$ = SESC) it as data. In addition, zero code suppression may be necessary if the message is transmitted over a type of link that requires it. For example, if zero code suppression is required and the message data (MSG) contains data corresponding to FF (hexadecimal notation), the transmitted data is an ESC byte followed by a 00 byte; the receiver recognizes the ESC byte and inverts the following byte thereby accepting an FF data byte.

Figure 3:
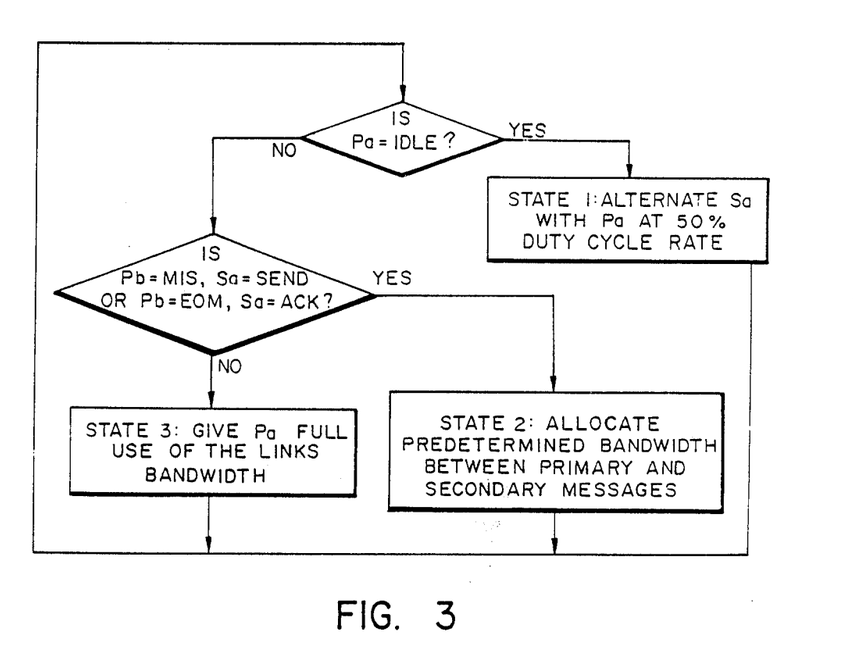
FIG. 3 is a flow chart illustrating the method of message multiplexing between the modules of FIG. 2.

As mentioned above, the DMS-Y full-duplex method of transmission is realized by multiplexing primary and secondary messages on the same link. In order to maximize the bandwidth dedicated to the primary message function while still providing reasonable delays in handshaking via the secondary message function, a set of rules or algorithm must be followed. For example, the algorithm in the direction of node A to node B is shown in the flowchart of FIG. 3 and expressed as follows:

If Pa=IDLE, THEN
   STATE 1: Alternate Sa with Pa at the duty cycle rate of 50%
ELSE
   If (Pb=MIS, Sa=SEND) or (Pb=EOM, Sa=ACK), THEN
     STATE 2: Alternate Sa with Pa starting immediately but at a duty cycle rate that provides predetermined bandwidth allocation between primary and secondary messages,
   ELSE
     STATE 3: Give Pa full use of the links bandwidth.

State 1 is the state during which protocol differentiation between DMS-X and DMS-Y takes place. The presence of primary IDLE characters is required before message transmission can begin and must follow the end-of-message EOM sequence else the receiving node will timeout.

State 2 prevents link protocol deadlocks from occurring whenever node B is trying to negotiate start-up of a message (Pb=MIS, Sa=SEND), or trying to terminate the message transaction (Pb=EOM, Sa=ACK). Alternation between Sa and Pa must begin immediately to minimize protocol handshake delays between the messaging pair Pb, Sa. The state codes IDLE, MIS, and EOM used during the compelled handshaking sequences are therefore transmitted consecutively at least twice to prevent wasting message processor capacity on invalid timeouts due to erroneous state transitions. Likewise, the receiving node does not advance to the next state in the sequence unless a filtered set of consecutive valid state codes have been received. The secondary messages are by definition already two bytes in length (SESC+code) and because they have been encoded to minimize their inadvertent conversion to other signals, the receiving transceiver only needs one secondary message before acknowledging reception. However, two such secondary messages may be transmitted due to link delays (turnaround time including byte processing) and allocated bandwidth between primary and secondary messages. Hence, the terminology "alternate Sa with Pa starting immediately" means that Sa can inject a message at the start of the next byte clock cycle, when Pa is not in the process of transmitting a pair of filtered state codes, else it must wait until the filtering action has taken place.

State 3 gives the primary message stream full access to the link medium.

Since the DMS-Y protocol uses a send-and-wait flow control mechanism, the intermessage delay is affected primarily by the link turnaround delay. Also, the overhead that secondary messages introduce on the primary message bandwidth while in state 2 can be reduced by increasing the primary to secondary multiplexing ratio.

Figure 4:
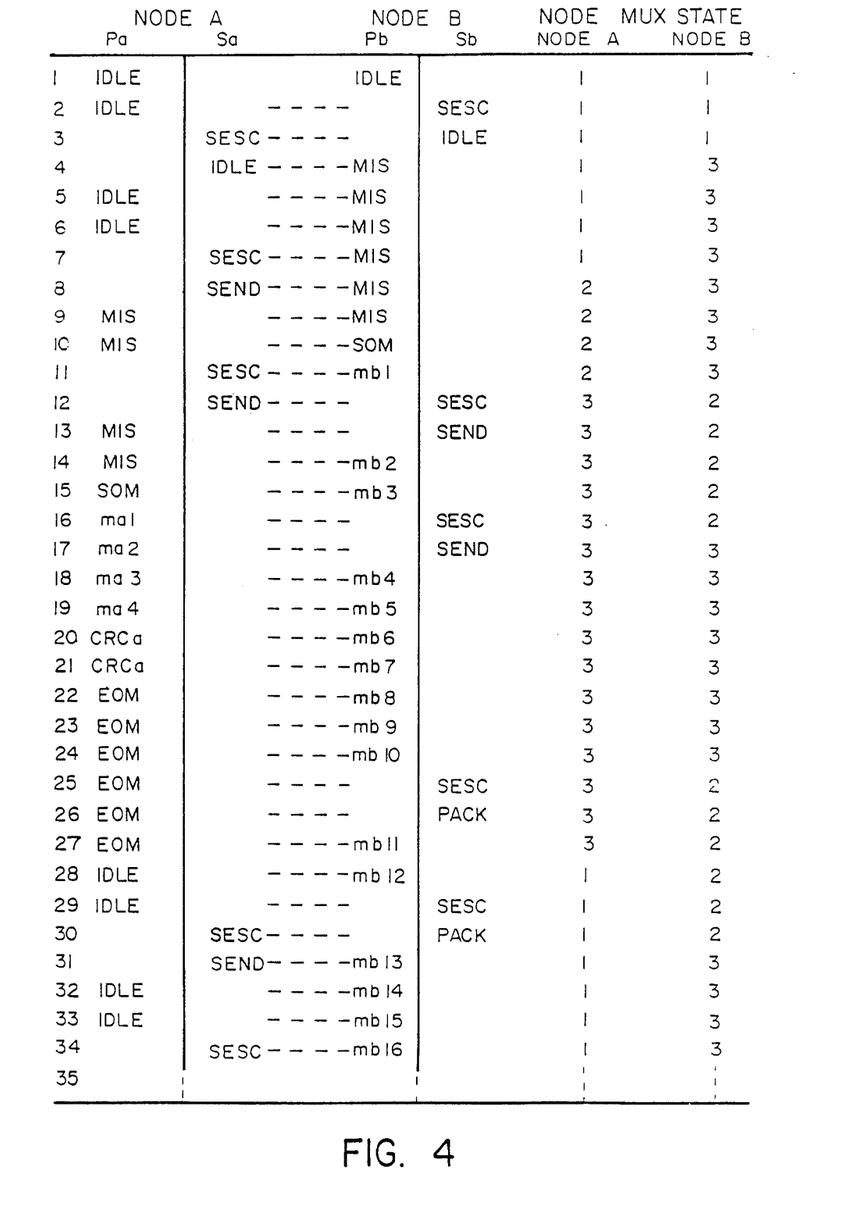
FIG. 4 is a table showing a typical message sequence in accordance with the method shown in FIG. 3.

FIG. 4 illustrates a typical sequence of messages that appear on the links 21 and 22 when node A transmits a message to node B while receiving a message from node B. The chart also indicates the state of the multiplexers at nodes A and B for each line of the sequence. Each line of the sequence represents a clock cycle and has been numbered for easy reference. As indicated earlier the primary messages Pa of node A are multiplexed with the secondary messages Sa on link 21. Similarly, the primary messages Pb of node B are multiplexed with the secondary messages Sb on line 22. The Sb messages are in response to the Pa messages whereas the Sa messages are in response to the Pb messages. It may be noted that secondary messages Sa and Sb each start with the SESC code which makes possible by the opposing node the differentiation between primary and secondary messages.

Until line 3, both nodes are idle and at line 4, node B requests permission to send a message (MIS). At line 7, node A indicates that it is ready to receive (SESC, SEND) and confirms it at line 11. At line 9, node A requests permission to send a message (MIS) and at line 10 node B starts transmitting its message (SOM). At line 12, node B indicates that it is ready to receive (SESC, SEND) and confirms it at line 16. At line 15, node A starts to send (SOM) its message followed by CRC and end-of-message (EOM) bytes. At line 25, node B indicates that it has correctly received (SESC, PACK) the message from node A and confirms it at line 29. Starting at line 28, node A goes idle and node B continues to send its message.

As mentioned above, the transceivers at nodes A and B adapted to use the method of transmission of the invention comprise a transmission interface circuit, a state machine generator and various buffers as well as a controller for generating the actual byte sequence, including ESC insertion and byte inversion, for transmission on the links and performing the corresponding operation on the received data. In order to insure that the system operates correctly, various timing functions must be performed by the transceiver. Some of these, as well as other error indicators, may be defined as follows:

WAS—Wait for SEND timeout. The transceiver has attempted to initiate a message transfer by transmitting MIS and was expecting permission to send (SEND) which did not arrive before timeout.

WAM—Wait for message timeout. The transceiver, upon receiving an MIS, replied with a SEND expecting to receive a SOM character which did not arrive before timeout.

OVERFLOW—While receiving a message, more than the permitted number of bytes were counted without EOM, indicating an invalid message length.

WAN—Wait for idle on acknowledgement (PACK or NACK). The transceiver has been transmitting ACK signals and expected the other transceiver to transmit an idle indication which did not occur within the timeout period.

WACK—Wait for acknowledge timeout. The receiving transceiver has not acknowledged the message just sent by either PACK or NACK within the allotted time.

NACK—Negative acknowledgement. The message just sent had a bad CRC or too many bytes of data were received.

These error indicators may be classified as catastrophic or transient. For example, WAS, WACK and WAN timeouts would be classified as catastrophic since they usually occur as a result of a hardware fault while WAM timeout, NACK and OVERFLOW may be classified as transient since they usually occur as a result of a hit on the link. The values used for these timeouts are of course predetermined in accordance with the configuration of the link and the transceivers.

Figure 5:
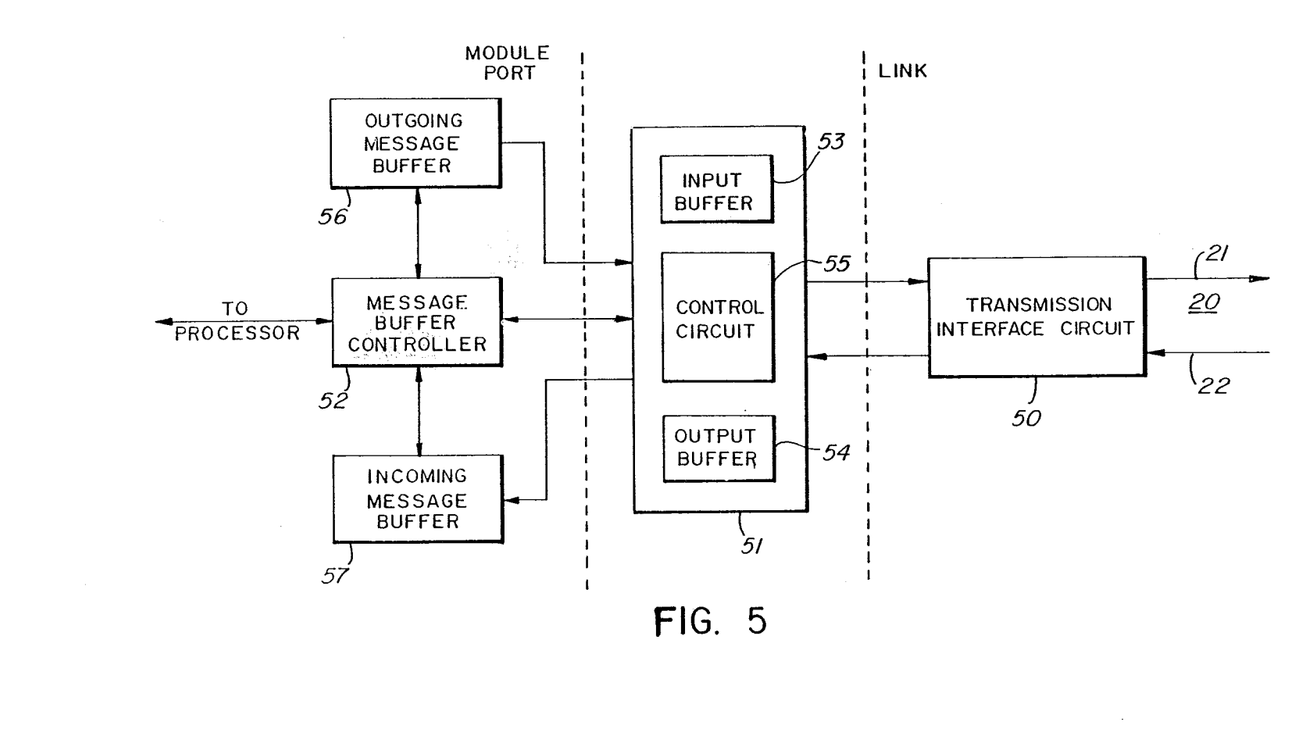
FIG. 5 is a block diagram of a transceiver shown in FIG. 2.

FIG. 5 illustrates in block diagram form generally the circuitry comprised at node A or B. The link 20 is connected to a transmission interface circuit 50 adapted to receive and transmit data thereon. In a typical system such as for example described in U.S. patent application Ser. No. 846,440 filed 31 March, 1986 and assigned to the present assignee, the data on the link 22 may be channelized data in the DS-512 format. The data to and from the interface circuit 50 is provided from a module port through a link handler circuit 51 adapted to interpret the protocol used on the link 20 and to provide data and control signals to a message buffer controller 52 on the module port. The link handler 51 comprises input buffer 53, output buffer 54, and a control circuit 55 comprising state machine generators for interpreting the data in accordance with one or more protocols. State machine generators are generally well-known in the art and may be described as a plurality of logic gates interconnected in such a manner that a predetermined input results in a corresponding response. Since the gates are actually wired logic, the response may be obtained very quickly. For example, for a 512 channel system operating at a frame rate of 125 microseconds, the link handler is capable of responding within a one byte (channel) period which corresponds to about 244 nanoseconds. The control circuit 55 also includes interface circuitry to the buffer controller 52 and the transmission interface circuit 50 as well as byte counters and CRC circuitry. The controller is connected to an outgoing message buffer 56 for storing the information to be transmitted on the link and an incoming message buffer 57 for storing the message data received on the link.

Figure 6:
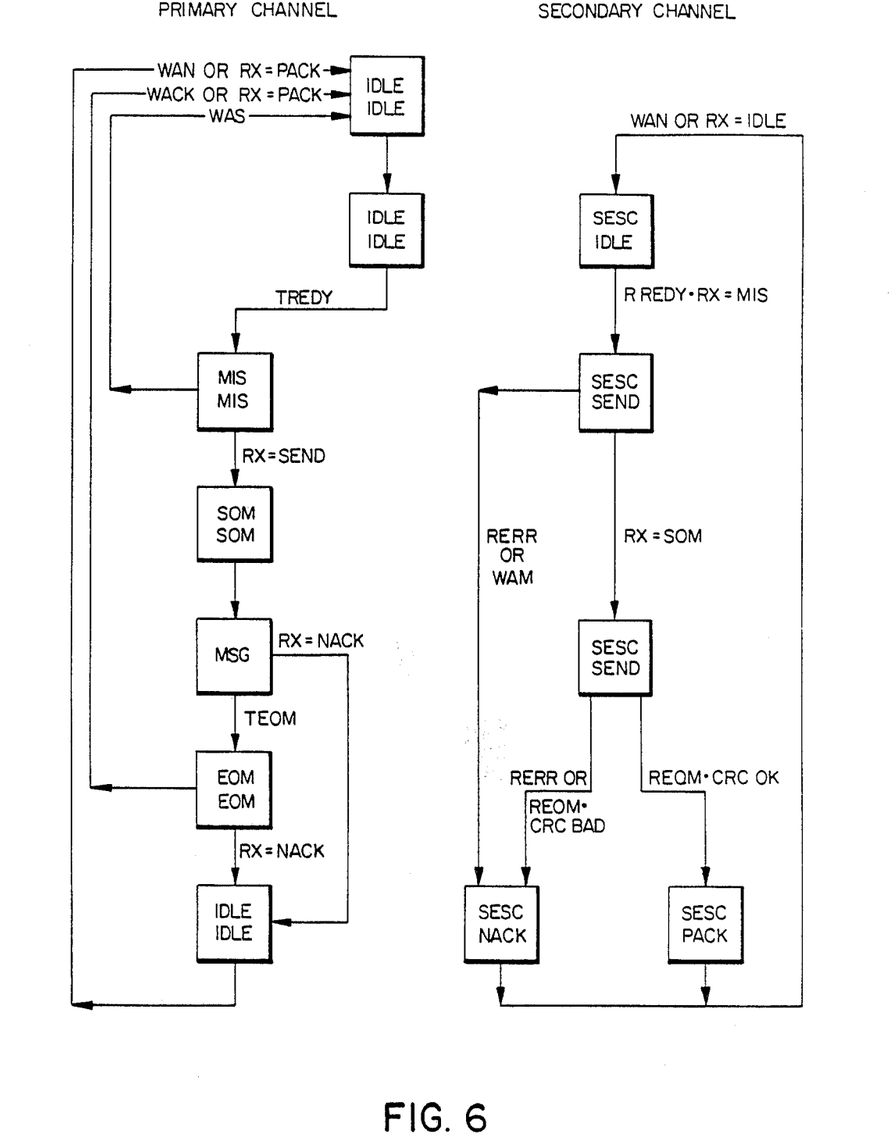
FIG. 6 is a state diagram of the method of the invention generated by a state machine generator in the transceiver shown in FIG. 5.

FIG. 6 is a state diagram corresponding to the DMS-Y state machine generator of control circuit 55. As discussed above, a full-duplex transmission on the link 20 is realized through the multiplexing of primary and secondary messages on each side of the link. Thus, each half-duplex channel consists of Pa - Sb and Pb - Sa. FIG. 6 is the state diagram for the primary messaging (e.g. Pa) of a node wishing to transmit on the link and for receiving secondary messaging (e.g. Sb) from the link. The state diagram is basically similar to the table of FIG. 4; the codes inside the boxes represent the codes transmitted on the link whereas the codes on the joining lines represent the information received by the state code generator to cause it to generate the codes in the boxes. These codes are defined as follows:

WAN, WACK, WAS—timeout signals
TREDY—port ready to transmit a message
RX=PACK—positive acknowledgement received
RX=NACK—negative acknowledgement received
RX=IDLE—received idle code
RREDY—Port ready to receive a message
RERR—receive abort from port
RX=SOM—received start of message
REOM—received EOM from the link As illustrated in the state diagram of FIG. 6, the state generator progresses through the handshaking procedure (IDLE, MIS, SEND) followed by the transmission of the message (SOM, MSG, EOM) and back to the idle condition. It may be noted that a NACK may be received at the transceiver during the MSG transmission if the length of the message being transmitted has for some reason exceeded the maximum predetermined length or a hit on the link has simulated an EOM bit sequence. Also, the lowest box in the primary channel diagram is the messaging pair IDLE, IDLE generated in response to the reception of NACK; at this occurrence, the message buffer controller may cause the message to be retransmitted or other maintenance action taken.

As mentioned above, a transceiver pair serves to connect the core modules of a switching system as well as to connect these modules to peripheral modules. In a large capacity system, a large number of these transceiver pairs are in use. In addition, some of the circuitry at a transceiver, for example the state generator, comprises a very large number of logic gates to realize the functions. The DMS-Y protocol may be used to provide a full verification of the correct operation of a transceiver. This is achieved by looping back the link on itself, that is by connecting the half-duplex links (e.g. 21 and 22 in FIG. 5) together. Since the transceiver is communicating with itself, the transmit and receive states become interlocked into a predetermined sequence which indicates correct operation of the transceiver.

Figure 7:
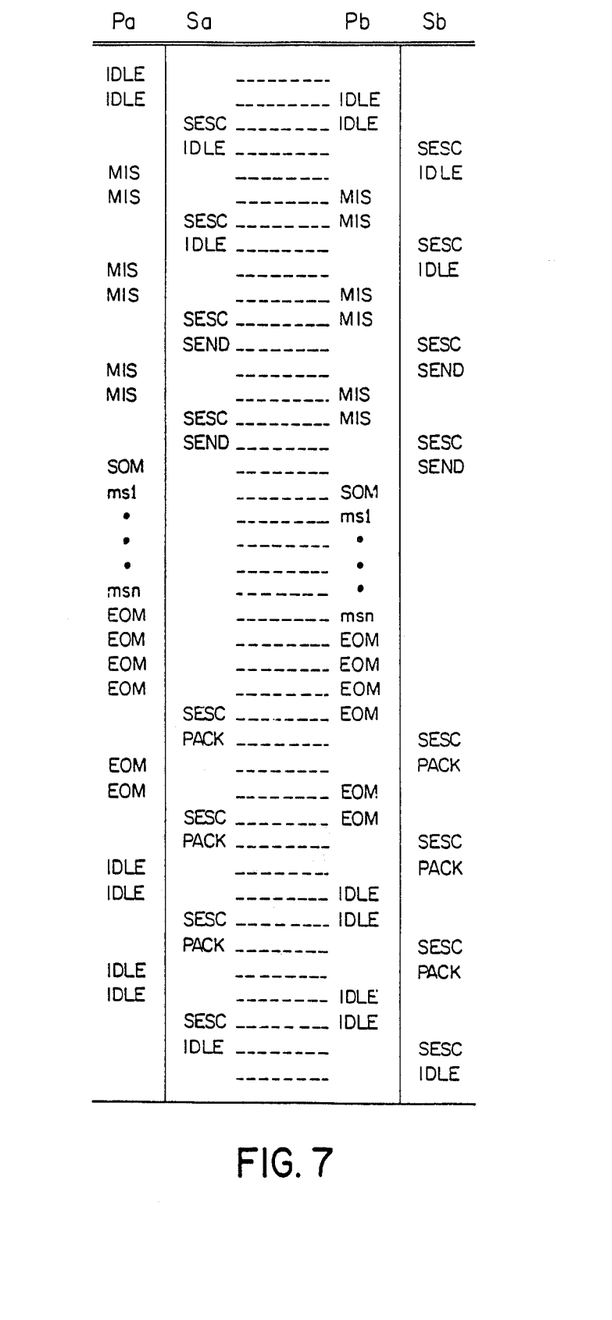
FIG. 7 is a table showing a message sequence resulting from having the link between two modules loop back on itself.

FIG. 7 shows a messaging sequence where a transceiver is looped back on itself. The sequence assumes that the sampling for Pa, Sa, Pb, and Sb occurs on the same edge of the link's byte clock, that Pb is delayed from Pa by one clock cycle, and similarly that Sb is delayed from Sa by one clock cycle. The sequence shows that the transceiver performs the handshaking sequence followed by an exchange of messages whereupon the transmit and receive states become interlocked into the following sequence:

... Pa-----Pb-----Sa-----Sb-----Pa ...

These states are shown as the last messaging pair of each column in the table of FIG. 7.

The invention provides a send-and-wait method of communicating data between a pair of transceivers that operates in full-duplex thus providing more efficient link utilization than was heretofore possible with the known send-and-wait protocols. The new method may be used as an automatic self-check for a transceiver by simply connecting its transmit and receive channels together and initiating a transmit cycle.

Although the invention was described using an example embodiment, it should be understood that other embodiments of the invention may be realized without departing from the scope and spirit of the invention.

What is claimed is:

1. A method of communicating data between a pair of transceivers in a full-duplex manner using a send-and-wait data handling protocol, the transceivers being connected by a pair of communication paths, each transceiver being adapted to simultaneously transmit data on one communication path and receive data on the other communication path comprising the steps of, at each transceiver, generating primary and secondary messages, multiplexing the primary messages with the seconary messages by injecting the secondary messages into the primary message stream, differentiating the secondary messages from the primary messages by preceding a secondary message with a control signal readily recognizable by the receiver and comprising the further steps of identifying said control signal as a part of the primary message data, the identification procedure comprising the step of recognizing at the transmitting transceiver that a bit sequence corresponding to said control signal is being transmitted and immediately following the control signal, injecting the complement of the control signal, the receiving transceiver being adapted to recognize the combination of the control signal followed by the complemented control signal.

2. The method of claim 1 wherein the receiving transceiver is responsive to the existence of the combination of a control signal followed by its complement by ignoring the control signal, complementing the complemented version of the control signal and allowing the bit sequence corresponding to the control signal to be received as correct data within the primary message.

3. The method of claim 2 wherein the messaging protocol is compelled by maintaining a messaging pair state until the expected response is received from a receiving transceiver or until a timeout is generated at the transmitting transceiver thereby to terminate the message pair state.

4. A method of communicating data between one and another transceiver in a full-duplex manner using a send-and-wait data handling protocol as defined in claim 1 wherein the multiplexing ratio of transmission between the primary and secondary messages for any one transceiver satisfies the rule that if said one transceiver is idle, the transmission of primary and secondary messages is alternated at the fifty percent duty cycle rate and if said another transceiver is negotiating start-up of a message or in the process of terminating a message transaction, the bandwidth between primary and secondary messages is allocated in a predetermined ratio, whereas if said one transceiver is transmitting and the other transceiver is not negotiating start-up of a message nor in the process of terminating a message transaction, the said one transceiver is allocated full use of its communication path.

5. A method of communicating data between one and another transceiver in a full-duplex manner using a send-and-wait data handling protocol, the transceivers being connected by a pair of communication paths, each transceiver being adapted to simultaneously transmit data on one communication path and receive data on the other communication path, comprising the steps of: at each transceiver, generating primary and secondary messages; a primary message comprising any one of, may I send, start of message, end of message, and idle code signals as well as message data; a secondary message comprising idle, permission to send, and acknowledgement code signals; and multiplexing the primary messages with the secondary messages by injecting the secondary messages into the primary message stream, each secondary message being preceded by a differentiation control code readily recognizable by the receiver and wherein the start of message and end of message signals are achieved with the same predetermined control code, the start of message signal comprising one appearance of the predetermined control code and the end of message signal comprising at least two appearances of the predetermined control code.

6. A method of communicating data between one and another transceiver in a full-duplex manner using a send-and-wait data handling protocol as defined in claim 5 and further comprising the step that, if message data being transmitted contains one or more bit sequences capable of being recognized at the receiver as the predetermined control code or the differentiation control code, replacing each of said bit sequences with its complement and preceding it with the predetermined control code, thereby causing the receiving transceiver to recognize that the said control codes form part of the message data.

7. A method of communicating data between one and another transceiver in a full-duplex manner using a send-and-wait data handling protocol as defined in claim 6 comprising the additional step that, if the communication paths between the transceivers require a zero-code suppression mode of transmission and the message data being transmitted contains one or more bytes of data incompatible with such mode of transmission, replacing each of said bytes of data with its complement and preceding it with said predetermined control code, thereby causing the receiving transceiver to correctly receive said bytes of data.

8. A method of communicating data between one and another transceiver in a full-duplex manner using a send-and-wait data handling protocol as defined in claim 6 wherein the handshaking protocol leading to the establishment of a communications link between the pair of transceivers is compelled.

9. A method of communicating data between one and another transceiver in a full-duplex manner using a send-and-wait data handling protocol as defined in claim 8 wherein the compelling function is achieved by maintaining a messaging pair state until the expected response to received from a receiving or transmitting transceiver or until a timeout occurs thereby to terminate the messaging pair state.

10. A method of communicating data between one and another transceiver in a full-duplex manner using a send-and-wait data handling protocol, the transceivers being connected by a pair of communication paths, each transceiver being adapted to simultaneously transmit data on one communication path and receive data on the other communication path, comprising the steps of: at each transceiver, generating primary and secondary messages; a primary message comprising any one of, may I send, start of message, end of message, and idle code signals as well as message data; a secondary message comprising idle, permission to send, and acknowledgement code signals; and multiplexing the primary messages with the secondary messages by injecting the secondary messages into the primary message stream, each secondary message being preceded by a differentiation control code readily recognizable by the receiver and wherein the multiplexing ratio of transmission between the primary and secondary messages for any one transceiver satisfies the rule that if said one transceiver is idle, the transmission of primary and secondary messages is alternated at the fifty percent duty cycle rate and if said another transceiver is negotiating start-up of a message or in the process of terminating a message transaction, the bandwidth between primary and secondary messages is allocated in a predetermined ratio, whereas if said one transceiver is transmitting and the other transceiver is not negotiating start-up of a message nor in the process of terminating a message transaction, the said one transceiver is allocated full use of its communication path.

* * * * *